United States Patent
Gazit et al.

(10) Patent No.: US 11,675,747 B2
(45) Date of Patent: Jun. 13, 2023

(54) SYSTEM AND METHOD FOR EARLY TAIL-RELEASE IN A LOG STRUCTURE LOG USING MULTI-LINE PLB STRUCTURE SUPPORTING MULTIPLE PARTIAL TRANSACTIONS

(71) Applicant: EMC IP Holding Company, LLC, Hopkinton, MA (US)

(72) Inventors: Ronen Gazit, Tel Aviv (IL); Vladimir Shveidel, Pardes-Hana (IL); Anton Kucherov, Dudley, MA (US); Amitai Alkalay, Kadima (IL)

(73) Assignee: EMC IP Holding Company, LLC, Hopkinton, MA (US)

(*) Notice: Subject to any disclaimer, the term of this patent is extended or adjusted under 35 U.S.C. 154(b) by 255 days.

(21) Appl. No.: 16/926,106

(22) Filed: Jul. 10, 2020

(65) Prior Publication Data
US 2022/0012215 A1    Jan. 13, 2022

(51) Int. Cl.
| | |
|---|---|
| G06F 16/00 | (2019.01) |
| G06F 16/18 | (2019.01) |
| G06F 16/17 | (2019.01) |
| G06F 12/0891 | (2016.01) |
| G06F 12/02 | (2006.01) |
| G06F 12/0882 | (2016.01) |
| G06F 16/27 | (2019.01) |

(52) U.S. Cl.
CPC ...... *G06F 16/1865* (2019.01); *G06F 12/0246* (2013.01); *G06F 12/0882* (2013.01); *G06F 12/0891* (2013.01); *G06F 16/1734* (2019.01); *G06F 16/278* (2019.01)

(58) Field of Classification Search
CPC ............ G06F 16/1865; G06F 12/0246; G06F 11/1076; G06F 16/278; G06F 12/0891; G06F 3/067; G06F 3/064; G06F 3/0689; G06F 3/0688; G06F 3/0659; G06F 16/1734; G06F 12/0882; G06F 3/061
See application file for complete search history.

(56) References Cited

U.S. PATENT DOCUMENTS

| | | | |
|---|---|---|---|
| 11,182,260 B1* | 11/2021 | Beier | G06F 11/2094 |
| 2009/0132868 A1* | 5/2009 | Chkodrov | H04L 51/00 |
| | | | 714/E11.187 |
| 2015/0293920 A1* | 10/2015 | Kanjirathinkal | G06F 16/313 |
| | | | 707/750 |
| 2016/0371145 A1* | 12/2016 | Akutsu | G06F 3/067 |
| 2017/0109409 A1* | 4/2017 | Nagy | H04L 41/00 |
| 2017/0337107 A1* | 11/2017 | Zhang | G06F 3/0685 |

* cited by examiner

*Primary Examiner* — Yicun Wu
(74) *Attorney, Agent, or Firm* — Brian J. Colandreo; Heath M. Sargeant; Holland & Knight LLP

(57) ABSTRACT

A method, computer program product, and computer system for obtaining, by a computing device, one or more pages from a log to complete a write transaction. Parity of a line in a multi-line physical layer block may be calculated. The one or more pages may be written to the line in the multi-line physical layer block. The parity to the line may be written in the multi-line physical layer block. A bitmap associated with the physical layer block may be updated based upon, at least in part, writing the one or more pages and the parity to the line in the multi-line physical layer block.

20 Claims, 6 Drawing Sheets

SYSTEM AND METHOD FOR EARLY TAIL-RELEASE IN A LOG STRUCTURE LOG USING MULTI-LINE PLB STRUCTURE SUPPORTING MULTIPLE PARTIAL TRANSACTIONS

BACKGROUND

Generally, in an active-active log-structure storage system, there may be a log structured data log that may contain the recently written pages (dirty) before they are further processed with their metadata updated. The log structured data log may be constructed in the form of a buffer (e.g., ring buffer) with a head (e.g., the first empty place in the ring for new writes) and a tail (e.g., the oldest write). Generally, to allow new writes to be accepted to the storage system, the old writes near the tail are processed, and written to their final storage place, otherwise known as "late bind."

BRIEF SUMMARY OF DISCLOSURE

In one example implementation, a method, performed by one or more computing devices, may include but is not limited to obtaining, by a computing device, one or more pages from a log to complete a write transaction. Parity of a line in a multi-line physical layer block may be calculated. The one or more pages may be written to the line in the multi-line physical layer block. The parity to the line may be written in the multi-line physical layer block. A bitmap associated with the physical layer block may be updated based upon, at least in part, writing the one or more pages and the parity to the line in the multi-line physical layer block.

One or more of the following example features may be included. The one or more pages in the log may be invalidated. A tail location in the log may be updated to a last non-written page. The tail location may be updated after completing the write transaction to the line. The multi-line physical layer block may be a physical layer block matrix. The multi-line physical layer block may support multiple partial transactions. The one or more pages may be split between the line in the multi-line physical layer block.

In another example implementation, a computing system may include one or more processors and one or more memories configured to perform operations that may include but are not limited to obtaining one or more pages from a log to complete a write transaction. Parity of a line in a multi-line physical layer block may be calculated. The one or more pages may be written to the line in the multi-line physical layer block. The parity to the line may be written in the multi-line physical layer block. A bitmap associated with the physical layer block may be updated based upon, at least in part, writing the one or more pages and the parity to the line in the multi-line physical layer block.

One or more of the following example features may be included. The one or more pages in the log may be invalidated. A tail location in the log may be updated to a last non-written page. The tail location may be updated after completing the write transaction to the line. The multi-line physical layer block may be a physical layer block matrix. The multi-line physical layer block may support multiple partial transactions. The one or more pages may be split between the line in the multi-line physical layer block.

In another example implementation, a computer program product may reside on a computer readable storage medium having a plurality of instructions stored thereon which, when executed across one or more processors, may cause at least a portion of the one or more processors to perform operations that may include but are not limited to obtaining one or more pages from a log to complete a write transaction. Parity of a line in a multi-line physical layer block may be calculated. The one or more pages may be written to the line in the multi-line physical layer block. The parity to the line may be written in the multi-line physical layer block. A bitmap associated with the physical layer block may be updated based upon, at least in part, writing the one or more pages and the parity to the line in the multi-line physical layer block.

One or more of the following example features may be included. The one or more pages in the log may be invalidated. A tail location in the log may be updated to a last non-written page. The tail location may be updated after completing the write transaction to the line. The multi-line physical layer block may be a physical layer block matrix. The multi-line physical layer block may support multiple partial transactions. The one or more pages may be split between the line in the multi-line physical layer block.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
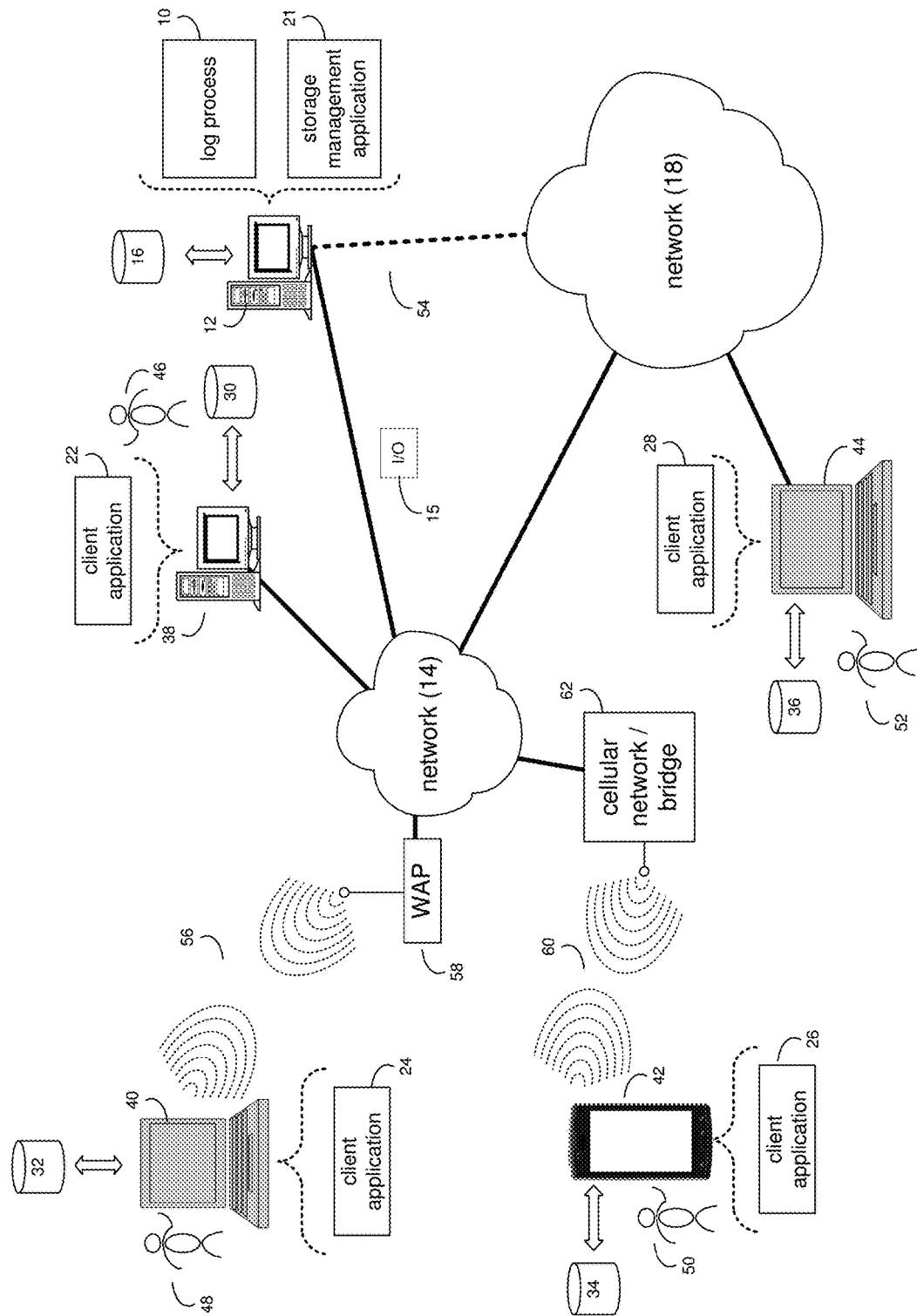
FIG. 1 is an example diagrammatic view of a log process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown log process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, e.g., a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a log process, such as log process 10 of FIG. 1, may obtain, by a computing device, one or more pages from a log to complete a write transaction. Parity of a line in a multi-line physical layer block may be calculated. The one or more pages may be written to the line in the multi-line physical layer block. The parity to the line may be written in the multi-line physical layer block. A bitmap associated with the physical layer block may be updated based upon, at least in part, writing the one or more pages and the parity to the line in the multi-line physical layer block.

In some implementations, the instruction sets and subroutines of log process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, log process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, log process 10 and/or storage management application 21 may be accessed via one or more of client applications 22, 24, 26, 28. In some implementations, log process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within log process 10, a component of log process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of log process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of log process 10 (and vice versa). Accordingly, in some implementations, log process 10 may be a purely server-side application, a purely client-side application, or a hybrid server-side/client-side application that is cooperatively executed by one or more of client applications 22, 24, 26, 28 and/or log process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, log process 10, and storage management application 21, taken singly or in any combination, may effectuate some or all of the same functionality, any description of effectuating such functionality via one or more of client applications 22, 24, 26, 28, log process 10, storage management application 21, or combination thereof, and any described interaction(s) between one or more of client applications 22, 24, 26, 28, log process 10, storage management application 21, or combination thereof to effectuate such functionality, should be taken as an example only and not to limit the scope of the disclosure.

In some implementations, one or more of users 46, 48, 50, 52 may access computer 12 and log process 10 (e.g., using one or more of client electronic devices 38, 40, 42, 44) directly through network 14 or through secondary network 18. Further, computer 12 may be connected to network 14 through secondary network 18, as illustrated with phantom link line 54. Log process 10 may include one or more user interfaces, such as browsers and textual or graphical user interfaces, through which users 46, 48, 50, 52 may access log process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
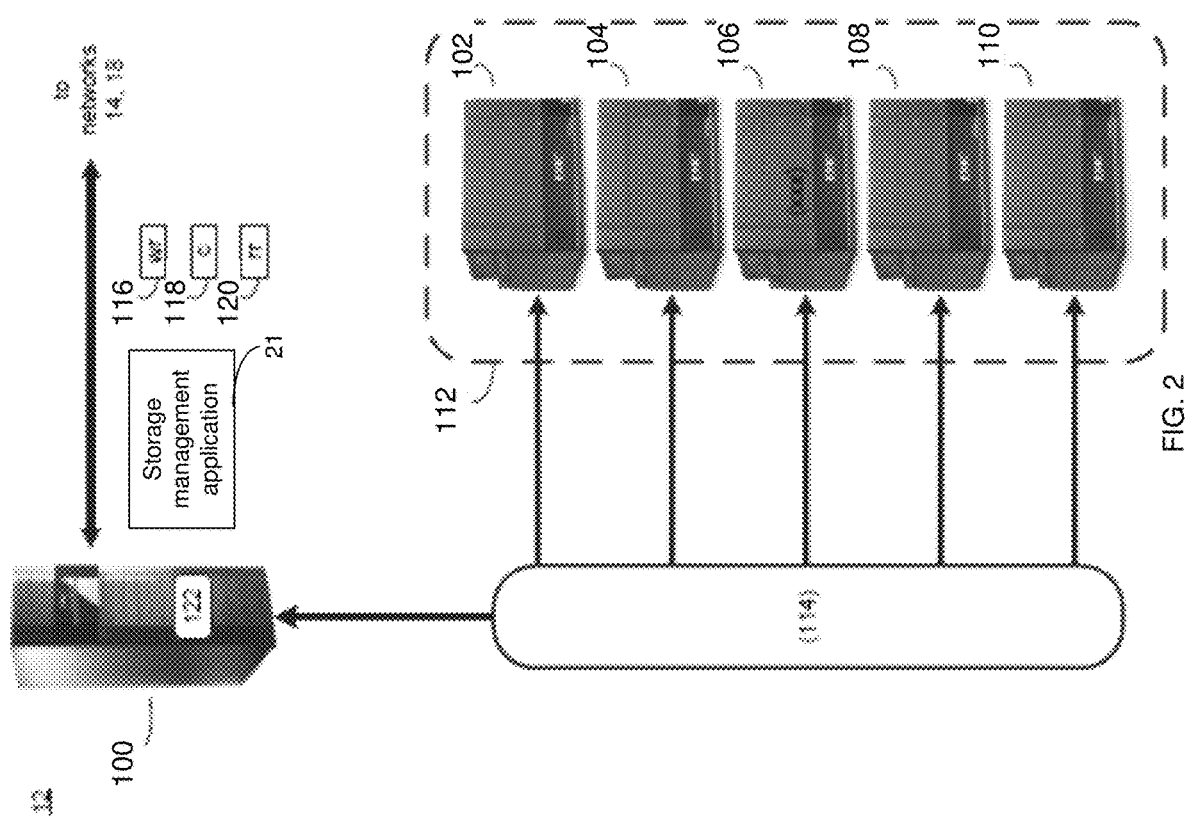
FIG. 2 is an example diagrammatic view of a storage system of FIG. 1 according to one or more example implementations of the disclosure.
Figure 3:
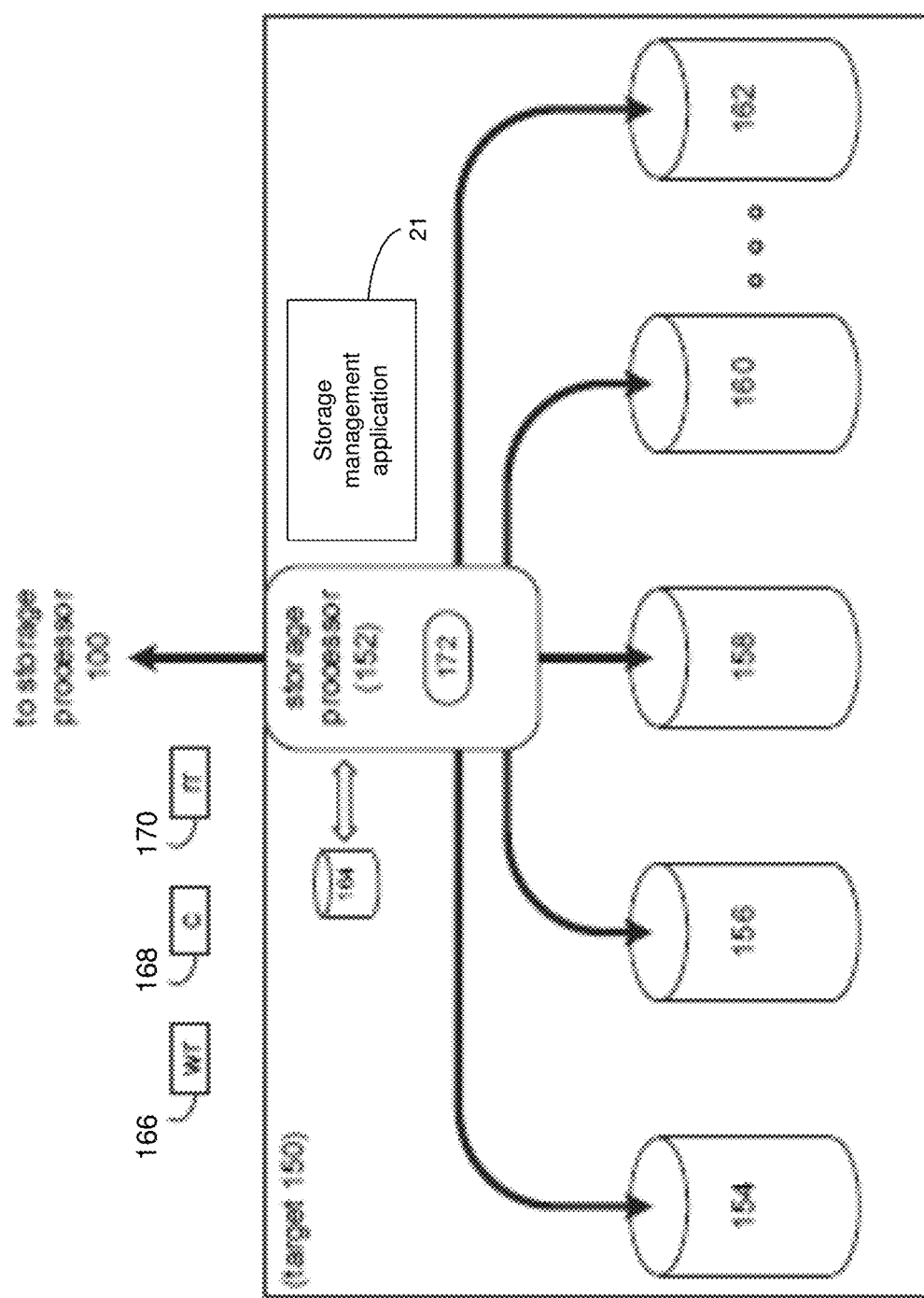
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX™, VNX™, TRIDENT™, or Unity™ system offered by Dell EMC™ of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or log process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VPLEX™, VNX™, TRIDENT™, or Unity™ system offered by Dell EMC™ of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/ performance/capacity required.

In some implementations, one or more of storage devices 154, 156, 158, 160, 162 may be configured to store (e.g., via storage management process 21) coded data, wherein such coded data may allow for the regeneration of data lost/ corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/ capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

As noted above, generally, in an active-active log-structure storage system, there may be a log structured data log that may contain the recently written pages (dirty) before they are further processed with their metadata updated. The log structured data log may be constructed in the form of a buffer (e.g., ring buffer) with a head (e.g., the first empty place in the ring for new writes) and a tail (e.g., the oldest write). Generally, to allow new writes to be accepted to the storage system, the old writes near the tail are processed, and written to their final storage place, otherwise known as "late bind." The rate of accepting new writes may be dependent on the rate of late blind operations, those are done by a process call "flush" (in the late bind flow).

Figure 4:
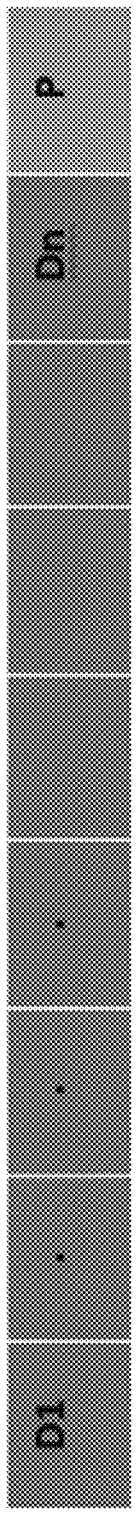
FIG. 4 is an example diagrammatic view of a physical layer block data structure according to one or more example implementations of the disclosure.

Further, in a log structured storage system, the pages are generally written in a storage unit that is termed physical layer block (PLB). An example of a PLB size may be 2 MB, holding, for example, 2000×4K page from the log, in a 2:1 compression and 2:1 deduplication scenario (considered a standard use-case in modern storage). An example PLB data structure 400 is shown in FIG. 4. In the example, the pages written to the PLB may be protected by parity (e.g., RAID5 or RAID6), and so the PLB must be written in a single transaction with its parity. Breaking writes into multiple transactions may generally require read-modify-write and log operations, which may be very costly and may reduce the system's performance.

As noted above, an example PLB data structure 400 is shown in FIG. 4. As seen in FIG. 4, box D1-Dn may be a storage device (e.g., disk) and the number of disks n may be defined by the RAID arrangement, where P is the parity, which may be a single storage device (e.g., disk) in RAID5 as above, or two disks in the case of RAID6. When writing to the PLB, in a single transaction the system may calculate the parity P for the entire PLB, write the entire PLB and the parity, and closes the transaction. To summarize, a flush transaction may include the following example steps:

(1) Getting pages from the log.
(2) Calculating parity of the pages.
(3) Writing all pages to the PLB
(4) Writing parity to the PLB
(5) Writing PLB descriptor
(6) In-memory invalidation of the log pages written to the PLB
(7) Update (if at all) of the tail location to the last non-written page.

Typically, in a multi-core, multi node, active-active storage system, there are multiple flushes operating at the same time, further, for optimal parallelism and utilization of the CPU, a reasonable allocation may be to have more than 1 flush per core. For instance, assume for example purposes only that there are 4 flushes per core, and a 2 node system, with 40 cores per node, giving a total of 320 flushes operating in parallel, each writing 2000×4K pages, so in total processing >640 MB of data in each cycle. This means, that for the tail to advance, the system may have to process 640 MB worth of user data in a single batch, delaying the move of the tail, and making tail movement non-smooth, and increasing the changes of log throttling, which is the case where the log is full and no new write I/Os are accepted to the system. This in turn creates both a reduction of the I/O per second (IOPS) and an increase of the latency.

An optional method to reduce the number of pages required to release the tail may be to reduce the PLB size, or use multiple PLB sizes and mix and match to the system status. Indeed, this option may solve the above-noted flush problem, but this technique may be very inefficient in terms of required metadata to manage the small PLB, it may also increase the overhead of wasted capacity per PLB, it may be much more complicated to manage in terms of the need to manage multiple free/used PLB lists, and at the very least may have a very complex NDU from a system that has already been using a single large size PLB.

Given all the down sides of the multiple sized PLB, the present disclosure enables a method to break the PLB transaction without the costly requirement for a read-modify-write operation, thus allowing for early tail-release and reducing log throttling by introducing a new API above the existing PLB that may make the PLB a multi-line PLB that supports multiple small transactions.

As will be discussed below, log process 10 may at least help, e.g., improve a technology, necessarily rooted in computer technology in order to overcome an example and non-limiting problem specifically arising in the realm of computer storage), thereby improving existing technological processes associated with and being integrated into the practical application of computer data storage. It will be appreciated that the computer processes described throughout are integrated into one or more practical applications, and when taken at least as a whole are not considered to be well-understood, routine, and conventional functions.

Figure 5:
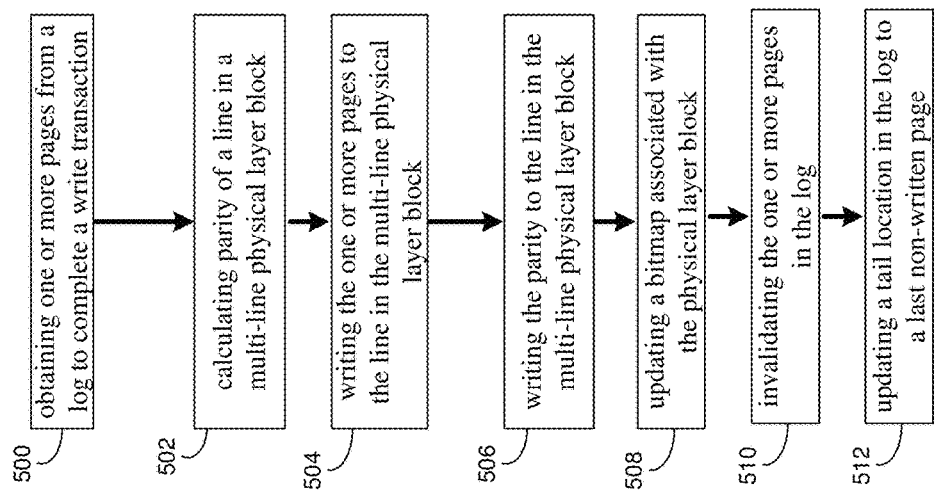
FIG. 5 is an example flowchart of a log process according to one or more example implementations of the disclosure.
Figure 6:
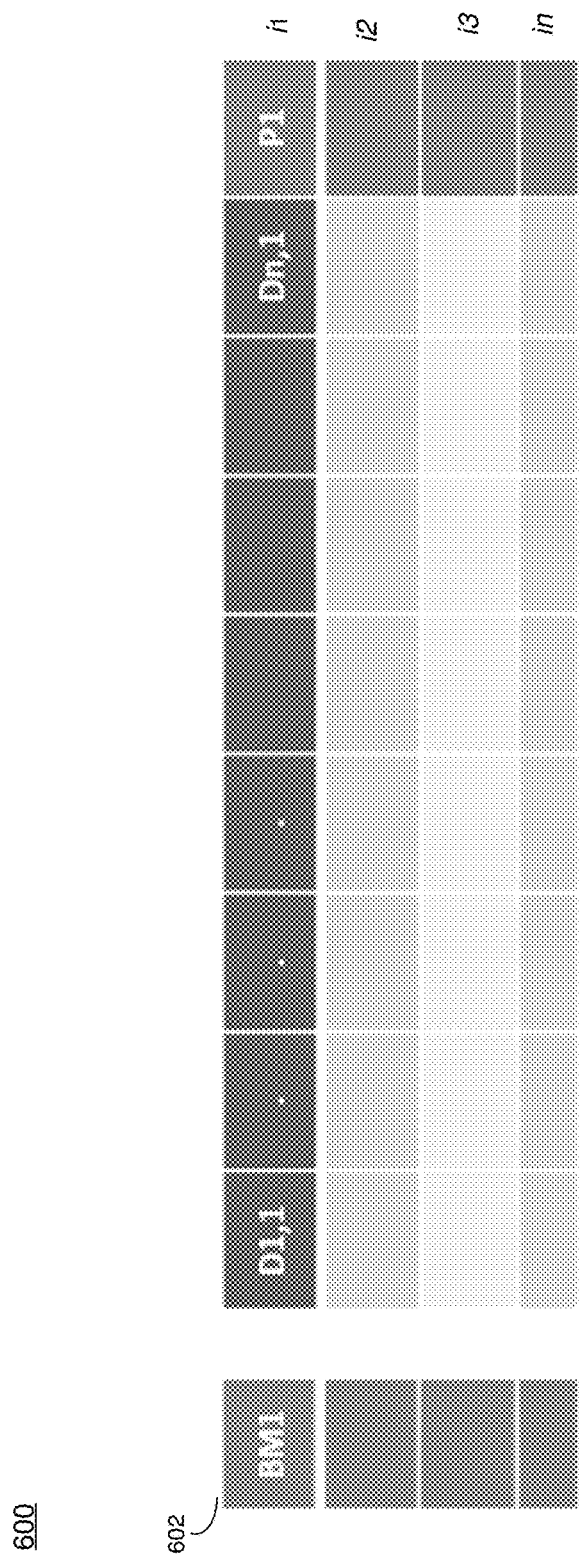
FIG. 6 is an example diagrammatic view of a multi-line physical layer block data structure according to one or more example implementations of the disclosure.

The Log Process:

As discussed above and referring also at least to the example implementations of FIGS. 5-6, log process 10 may obtain 500, by a computing device, one or more pages from a log to complete a write transaction. Log process 10 may calculate 502 parity of a line in a multi-line physical layer block. Log process 10 may write 504 the one or more pages to the line in the multi-line physical layer block. Log process 10 may write 506 the parity to the line in the multi-line physical layer block. Log process 10 may update 508 a bitmap associated with the physical layer block based upon, at least in part, writing the one or more pages and the parity to the line in the multi-line physical layer block.

In some implementations, log process 10 may obtain 500, by a computing device, one or more pages from a log to complete a write transaction. For instance, assume for example purposes only that log process 10 is operating in an active-active log-structure storage system. In the example, there may be a log structured data log that may contain the recently written pages (dirty) before they are further processed with their metadata updated. As such, in the example log process 10 may obtain 500 these pages from the log. In some implementations, the log structured data log may be constructed in the form of a buffer (e.g., ring buffer) with a head (e.g., the first empty place in the ring for new writes) and a tail (e.g., the oldest write); however, it will be appreciated that other types of buffers may also be used.

As will be discussed below, in some implementations, log process 10 may calculate 502 parity of a line in a multi-line physical layer block, in some implementations, may write 504 the one or more pages to the line in the multi-line physical layer block, and may write 506 the parity to the line in the multi-line physical layer block. For instance, and referring at least to the example implementation of FIG. 6, an example physical layer block (PLB) data structure 600 is shown. In some implementations, the multi-line physical layer block may be a physical layer block matrix. In the example, it can be seen that PLB data structure 400 (from FIG. 4) has been augmented by composing a PLB matrix and adding a new PLB two way bitmap (2-WBM) 602 or other bitmap, thus creating a multi-line PLB supporting multiple partial transactions.

In some implementations, log process 10 may update 508 a bitmap associated with the physical layer block based upon, at least in part, writing the one or more pages and the parity to the line in the multi-line physical layer block. As will be discussed below, in the example, the new PLB structure 600 allows writing to the PLB in multiple transactions, instead of the above 1 transaction in FIG. 4. Each transaction may include BM entry update 508 (e.g., 0 means PLB line is empty, 1 means PLB line is used), updating line i of disks in the PLB (e.g., D1, 1-Dn, 1) and the associated parity P (e.g., P1) of that line.

It will be appreciated that due to the multi-line structure, writing subsequent transactions to the PLB does not require updating previously written transaction, as each transaction (i.e., each line i) is independent and protected by its own parity (e.g., it is protected by P1, i2 is protected by P2, etc.). The new bitmap (BM) associated with a PLB may be maintained together with the PLB descriptor that already exists, and may be updated 508 as part of a PLB transaction.

To summarize, an example and non-limiting flush transaction using the mulit-line PLB may be as follows:

(1) Get/obtain 500 pages from the log.
(2) Cycle though each PLB line and perform the following.
  (2a) Calculate 502 line i (e.g., i1) parity
  (2b) Write 504 all pages to line i (e.g., i1) of the PLB
  (2c) Write 506 parity i (e.g., P1) to line i (e.g., i1) of the PLB
  (2d) Update 508 the BM in the PLB descriptor
(3) In-memory invalidation 510 of the log pages written to line i (e.g., i1) of the PLB
(4) Update 512 (if at all) of the tail location to the last non-written page.
(5) Close transaction i (e.g., i1)
(6) Go to step 2 and repeat for each line.

In some implementations, log process 10 may update the tail location after completing the write transaction to the line. For example, as can be seen, the transaction is very similar to the above-noted original full PLB transaction with the difference that the full transaction from FIG. 4 is split into i transactions, where after each small transaction the tail of the log is updated 512 by log process 10.

In some implementations, the recovery procedure of the flush may remain the same as the full PLB transaction, where the tail and head of the log is recovered, and the ring descriptors are read into memory allowing for the flush to resume. There is no need to resume the PLB that was partially written, as the PLB descriptor may be fully updated to the last closed line transaction and it may be used again as part of compact & append or garbage collection exiting flows.

In some implementations, the multi-line physical layer block may support multiple partial transactions. For example, the new multi-line PLB does not change the actual PLB object, but only modifies its API, to allow multiple lines with parity partial transactions. As the parity is calculated, it is an operation over lines of data, and so existing full transaction PLBs are fully compatible with the newly defined multi-line PLB. As a result of this compatibility, this upgrade does not require any data rewrite, and only the addition of the new BM, which for a single line PLB, would mean that all bits in the BM are set to 1 (in this example).

In some implementations, log process 10 may invalidate 510 the one or more pages in the log, and in some implementations, log process 10 may update 512 a tail location in the log to a last non-written page. For example, following the new multi-line PLB structure, the transaction of the flush operation as part of the late-bind may be broken into a multiple partial transaction, where at the end of each such partial transaction the flush may (e.g., via log process 10)

invalidate 510 the pages in the log and allow for an early tail release, where the tail location in the log is updated 512 to the last non-written page.

If for example, we define a multi-line PLB having 16 lines, then the calculation for the number of pages in each flush batch that previously was the following with a single line PLB:

Assume for example purposes only that there are 4 flushes per core, and a 2-node system, with 40 cores per node, giving a total of 320 flushes operating in parallel, each writing 2000×4K pages, so in total processing >640 MB of data in each cycle.

When using the multi-line PLB, this may be improved by a factor of, e.g., 16, that is 40 MB of data, which is expected to improve log throttling to become completely controlled, and non-existent.

In some implementations, the number of lines in a multi-line PLB may be set by a trade-off between the number of acceptable pages in a parallel batch, and the expected low of the PLB capacity at the boundary of each line. A worse case estimation may assume a loss of half a page at the boundary of each line, in the case of a 2:1 compression, 2:1 deduplication, a 16 line multi-line PLB may have the following example efficiency:

16×1 KB/2000 MB=0.8%, which seems very acceptable for the overall system utilization.

In some implementations, the one or more pages may be split between the line in the multi-line physical layer block. For example, the present disclosure may have a better capacity utilization if the system is enabled to split pages between PLB lines. While this may require a more complex transaction, it may offset the example 0.8% potential loss to a much lower number. Generally, a split page means to take part of a 4K page and put in one line and the remaining part in the next line. This may be optimal (although not required) for capacity but may require more logging and accounting to free the split page only after the second line was written. So this is added complexity but better capacity.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    obtaining, by a computing device, one or more pages from a log to complete a write transaction;
    calculating parity of a line in a multi-line physical layer block where each write transaction is independent and protected by the parity of the line in the multi-line physical layer block such that writing one or more subsequent write transactions to the multi-line physical layer block does not update a previous write transaction;
    writing the one or more pages to the line in the multi-line physical layer block;
    writing the parity to the line in the multi-line physical layer block; and
    updating a bitmap associated with the multi-line physical layer block based upon, at least in part, writing the one or more pages and the parity to the line in the multi-line physical layer block.

2. The computer-implemented method of claim 1 further comprising invalidating the one or more pages in the log.

3. The computer-implemented method of claim 2 further comprising updating a tail location in the log to a last non-written page.

4. The computer-implemented method of claim 3 wherein the tail location is updated after completing the write transaction to the line.

5. The computer-implemented method of claim 1 wherein the multi-line physical layer block is a physical layer block matrix which is composed by augmenting a physical layer block.

6. The computer-implemented method of claim 1 wherein the multi-line physical layer block supports multiple partial transactions.

7. The computer-implemented method of claim 1 wherein the one or more pages are split between the line in the multi-line physical layer block.

8. A computer program product residing on a computer readable storage medium having a plurality of instructions stored thereon which, when executed across one or more processors, causes at least a portion of the one or more processors to perform operations comprising:
    obtaining one or more pages from a log to complete a write transaction;
    calculating parity of a line in a multi-line physical layer block where each write transaction is independent and protected by the parity of the line in the multi-line physical layer block such that writing one or more subsequent write transactions to the multi-line physical layer block does not update a previous write transaction;
    writing the one or more pages to the line in the multi-line physical layer block;
    writing the parity to the line in the multi-line physical layer block; and updating a bitmap associated with the multi-line physical layer block based upon, at least in part, writing the one or more pages and the parity to the line in the multi-line physical layer block.

9. The computer program product of claim 8 wherein the operations further comprise invalidating the one or more pages in the log.

10. The computer program product of claim 9 wherein the operations further comprise updating a tail location in the log to a last non-written page.

11. The computer program product of claim 10 wherein the tail location is updated after completing the write transaction to the line.

12. The computer program product of claim 8 wherein the multi-line physical layer block is a physical layer block matrix which is composed by augmenting a physical layer block.

13. The computer program product of claim 8 wherein the multi-line physical layer block supports multiple partial transactions.

14. The computer program product of claim 8 wherein the one or more pages are split between the line in the multi-line physical layer block.

15. A computing system including one or more processors and one or more memories configured to perform operations comprising:
obtaining one or more pages from a log to complete a write transaction;
calculating parity of a line in a multi-line physical layer block where each write transaction is independent and protected by the parity of the line in the multi-line physical layer block such that writing one or more subsequent write transactions to the multi-line physical layer block does not update a previous write transaction;
writing the one or more pages to the line in the multi-line physical layer block;
writing the parity to the line in the multi-line physical layer block; and
updating a bitmap associated with the physical layer block based upon, at least in part, writing the one or more pages and the parity to the line in the multi-line physical layer block.

16. The computing system of claim 15 wherein the operations further comprise invalidating the one or more pages in the log.

17. The computing system of claim 16 wherein the operations further comprise updating a tail location in the log to a last non-written page.

18. The computing system of claim 17 wherein the tail location is updated after completing the write transaction to the line.

19. The computing system of claim 15 wherein the multi-line physical layer block is a physical layer block matrix which is composed by augmenting a physical layer block, and wherein the multi-line physical layer block supports multiple partial transactions.

20. The computing system of claim 15 wherein the one or more pages are split between the line in the multi-line physical layer block.

* * * * *